United States Patent
Krebs et al.

(10) Patent No.: US 10,047,793 B2
(45) Date of Patent: Aug. 14, 2018

(54) CAGE OF A ROLLER BEARING AND METHOD FOR PRODUCING SUCH A CAGE

(71) Applicant: Aktiebolaget SKF, Gothenburg (SE)

(72) Inventors: Philipp Krebs, Gerolstein (DE); Gilbert Peters, Utrecht (NL); Sebastian Ziegler, Bamberg (DE); Gregory A Zimmerman, Pennsburg, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 13 days.

(21) Appl. No.: 15/313,196

(22) PCT Filed: Jun. 29, 2015

(86) PCT No.: PCT/EP2015/064695
§ 371 (c)(1),
(2) Date: Nov. 22, 2016

(87) PCT Pub. No.: WO2016/001137
PCT Pub. Date: Jan. 7, 2016

(65) Prior Publication Data
US 2017/0191527 A1    Jul. 6, 2017

(30) Foreign Application Priority Data
Jul. 3, 2014    (GB) .................................. 1411890.5

(51) Int. Cl.
*F16C 33/38*    (2006.01)
*F16C 33/46*    (2006.01)

(52) U.S. Cl.
CPC ............ *F16C 33/38* (2013.01); *F16C 33/385* (2013.01); *F16C 33/3806* (2013.01);
(Continued)

(58) Field of Classification Search
CPC .. F16C 33/38; F16C 33/3806; F16C 33/3843; F16C 33/385; F16C 33/3887; F16C 33/46
See application file for complete search history.

(56) References Cited

U.S. PATENT DOCUMENTS

| | | | | |
|---|---|---|---|---|
| 856,209 | A | * | 6/1907 | Barthel .................... F16C 33/38 29/898.061 |
| 1,494,012 | A | * | 5/1924 | Parsons .................. F16C 33/427 384/530 |

(Continued)

FOREIGN PATENT DOCUMENTS

| | | | | |
|---|---|---|---|---|
| DE | 3116979 | A1 * | 11/1982 | .......... F16C 33/4641 |
| GB | 2521395 | A  * | 6/2015 | .......... F16C 33/3831 |

*Primary Examiner* — Thomas R Hannon
(74) *Attorney, Agent, or Firm* — Bryan Peckjian; SKF USA Inc. Patent Dept.

(57) ABSTRACT

A cage for a roller bearing is provided. The cage has a ring-shaped base body with a plurality of pockets for receiving rolling elements. The base body is formed by two side rings arranged in a defined axial distance and by a plurality of pocket elements, which are located between the side rings. Each pocket element has two face sides designed for contacting a rolling element. The connection between the pocket element and each of the side rings is established by at least one beam joined with one of the side rings and the pocket element. The beam is a positive substance joined with one of the side rings and the pocket element and has a ring-shaped or elliptical cross section in a section perpendicular to the longitudinal extension of the beam.

17 Claims, 10 Drawing Sheets

(52) U.S. Cl.
CPC ...... *F16C 33/3843* (2013.01); *F16C 33/3887* (2013.01); *F16C 33/46* (2013.01)

(56) References Cited

U.S. PATENT DOCUMENTS

| | | | | |
|---|---|---|---|---|
| 3,403,951 | A * | 10/1968 | Bailey | F16C 33/3843 |
| | | | | 384/528 |
| 3,450,449 | A * | 6/1969 | Sibley | F16C 33/3843 |
| | | | | 384/465 |
| 8,814,437 | B2 * | 8/2014 | Braun | B29C 67/0051 |
| | | | | 29/898.067 |

* cited by examiner

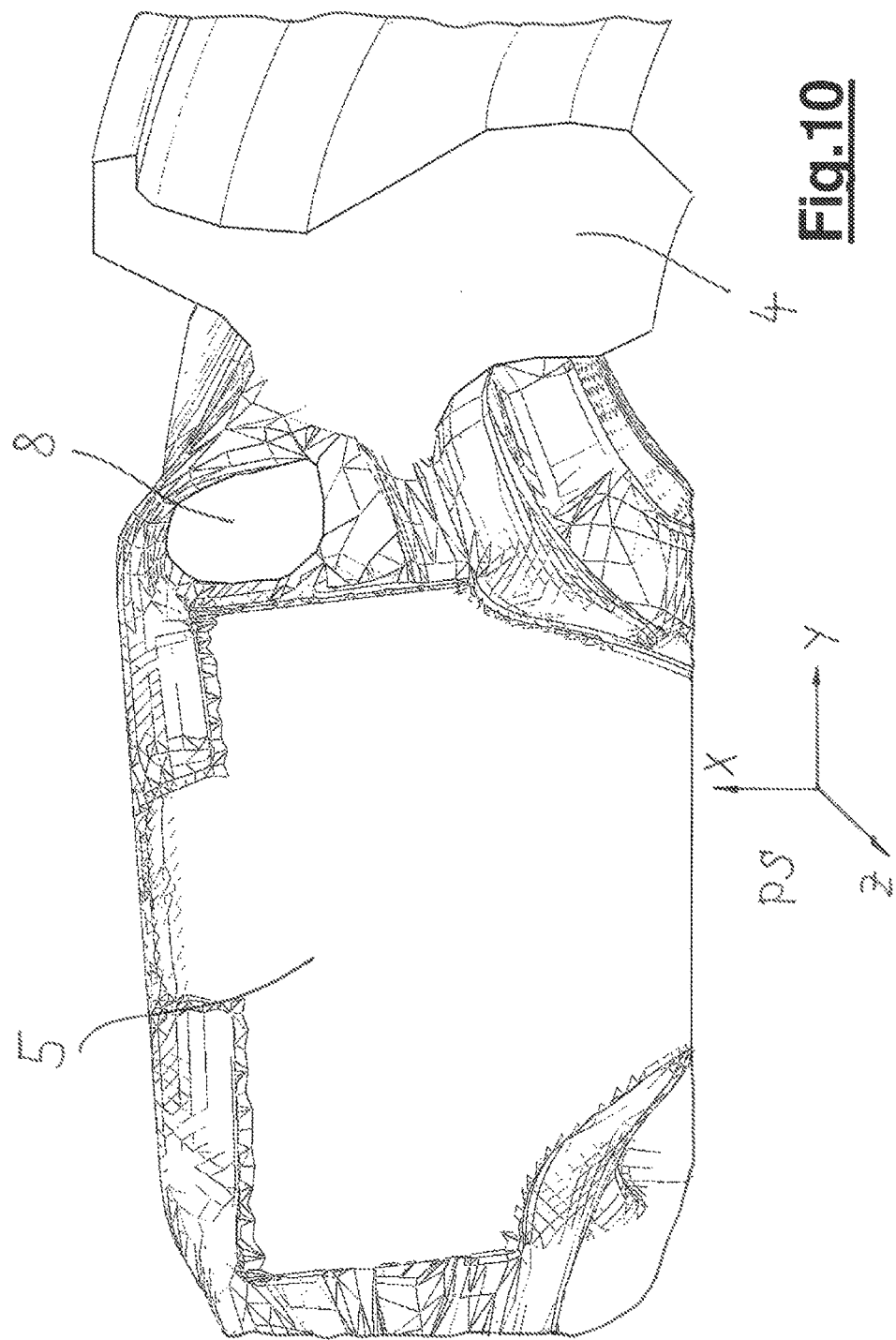

CAGE OF A ROLLER BEARING AND METHOD FOR PRODUCING SUCH A CAGE

CROSS REFERENCE TO RELATED APPLICATIONS

This is a United States National Stage Application claiming the benefit of International Application Number PCT/EP2015/064695 filed on Jun. 29, 2015 which claims the benefit of British Patent Application 1411890.5 filed on 7 Mar. 2014, both of which are incorporated herein by reference in their entireties.

FIELD OF THE INVENTION

The invention relates to a cage of a roller bearing, wherein the cage has a basically ring-shaped base body with a plurality of pockets for receiving of rolling elements. Furthermore, the invention relates to a method for producing such a cage.

BACKGROUND OF THE INVENTION

Cages of roller bearings are usually rotationally symmetric components that are normally made by stamping or injection molding for medium and high production volumes and by turning and milling for low volume production or if high strength and/or special materials are required. In the latter case, manufacturing starts typically with a tube material that is then turned to the right dimension. The receiving pockets of the cage are then machined.

This classical production technology means however, that any additional removal of material which is not needed for the strength of the cage (for example to reduce weight) increases production time and cost. If the material is at a location which cannot be reached by a turning or milling tool, it cannot be removed.

Despite the fact that this material is not needed and removed later it must still be paid for and thus causes cost. Hence the raw material cost is higher than necessary with respect to the required strength of the cage.

For applications that are not weight-sensitive the machining time is thus minimized and extra weight is accepted.

It is an object of the present invention to develop a cage and a method for its production which allow overcoming the mentioned drawbacks. Thus, it should become possible to obtain a cage in a cost efficient manner which is light but has the required strength and stiffness. Consequently, the required material should be minimized and located only at those regions where it is necessary to carry the load without relevant deformations of the cage.

BRIEF SUMMARY OF THE INVENTION

A solution according to the invention is characterized in that the base body of the cage is formed by two side rings which are arranged in a defined axial distance and by a plurality of pocket elements, which are located between the side rings, wherein each pocket element has two face sides which are designed for contacting a rolling element.

The connection between the pocket element and each of the side rings is established only by at least one beam, which beam is positive substance joined with one of the side rings and the pocket element. The at least one beam has a ring-shaped or elliptical cross section in a section perpendicular to the longitudinal extension of the beam. No further connection exists between the pocket element and each of the side rings.

Preferably, four or six beams are arranged to establish the connection between the pocket element and each of the side rings.

The at least one beam can have a minimum diameter which is between 10% and 20%, preferably 15%, of the diameter of the rolling element. The beam can further have an enlarged diameter at the location where it merges with the side ring or with the pocket element, wherein the diameter at that location is double the value of the minimum diameter of the beam.

The at least one beam can further have a rounding radius at the location where it merges with the side ring or with the pocket element, wherein the rounding radius is 0.2 mm to 0.3 mm or 2.0% to 3.0% of the diameter of the rolling element, whichever is bigger. The at least one beam is preferably designed as rod-shaped elements.

The two side rings are preferably spaced in an axial distance in which a radial outer opening for the rolling elements is given between 92.5% and 97.5% of the diameter of the rolling elements in the case of a ball bearing and of the length of the rolling elements in the case of a roller bearing.

The side rings can furthermore have a concave shape at a face side.

The side rings extend radially preferably between an inner radius which corresponds to a pitch circle of the roller bearing and an outer radius which corresponds to the pitch circle plus half of the diameter of the rolling element.

The surface of the side rings which are facing the rolling elements can comprise a substantially radial outer rectangular portion and an adjoining radial inner trapezoid portion seen perpendicular onto the surface.

The face sides of the pocket elements have preferably a concave surface, wherein the concave surface is spherical and has a radius which is between 105% and 115% of the diameter of the rolling elements.

The method for producing a cage of the type as explained above is characterized in that the production of the cage is carried out by means of an additive manufacturing process. Here, but this is not mandatory, a plastic material can be used for the production of the cage.

The production of the cage is preferably carried out by means of a 3-D-printing process. Also, a metal laser sintering process, a metal laser melting process or a plastic laser sintering process can be employed. Also, a stereo-lithographic process is possible.

Preferably, at least 10% of the volume, specifically preferred at least 30% of the volume, of the basis geometry of the cage—compared with a cage design according to the state of the art—is realized. A respective manufactured cage can have e.g. 60% less volume and weight than a classical cage.

The basis geometry of the cage is preferably hollow cylindrical.

According to one possibility, the cage is produced—as said—from a plastic material. This is specifically the case when a 3-D-printing process is used for the production of the cage.

Also, the cage can be produced from a metal material. Here, specifically a light metal is considered like titanium, aluminum or magnesium. Also, steel can be employed.

Metal cages can be especially suitable due to more strength reserves which allow a high degree of material removal (compared with a classical cage according to the state of the art) and also with respect to a higher accuracy when using the 3-D-technology.

By the proposed concept a lightweight cage is obtained which has significant less weight than a cage with a base geometry which is given at the beginning of the process. In spite of this a quite stable and stiff cage is obtained which carries the occurring loads without a relevant deformation.

A typical bearing cage is optimized for stamping, turning, milling and/or injection molding. An additive manufacturing method like the 3-D-printing of the material of the cage allows an easy and cost-efficient production of a geometry of the cage which is not possible with traditional manufacturing technologies or which are at least very laborious and thus expensive.

An alternative is to produce the cage using a lost foam or lost wax process.

By the proposed cage concept the geometry of the cage can be optimized with respect to weight and strength issues.

The proposed cage is suitable for many applications; preferred applications are in the field of aerospace and other fields where lightweight design or low inertia is required of beneficially. Special application like super precision bearings, aerospace and racing should be mentioned in this connection.

For weight-sensitive applications like aerospace or racing an optimized tradeoff is found due to the invention between weight, strength and production time of the cage.

The cage can be designed between 30% and 70% lighter while maintaining its functionality and reducing the amount of raw material which is required and thereby potentially raw material cost. In additive manufacturing raw material costs are more significant than with traditional manufacturing because powder is more expensive than bulk steel.

The reduced inertia is a further advantage in applications with high acceleration and deceleration. In some applications the reduced stiffness can also be an advantage because the bearing can react to misalignment and acceleration/deceleration in a more flexible way.

BRIEF DESCRIPTION OF THE SEVERAL VIEWS OF THE DRAWING

The drawings show embodiments of the invention.

FIG. 10 shows a cross section of one of the beams, wherein the cross section is oriented according to the beam direction.

DETAILED DESCRIPTION OF THE INVENTION

Figure 1:
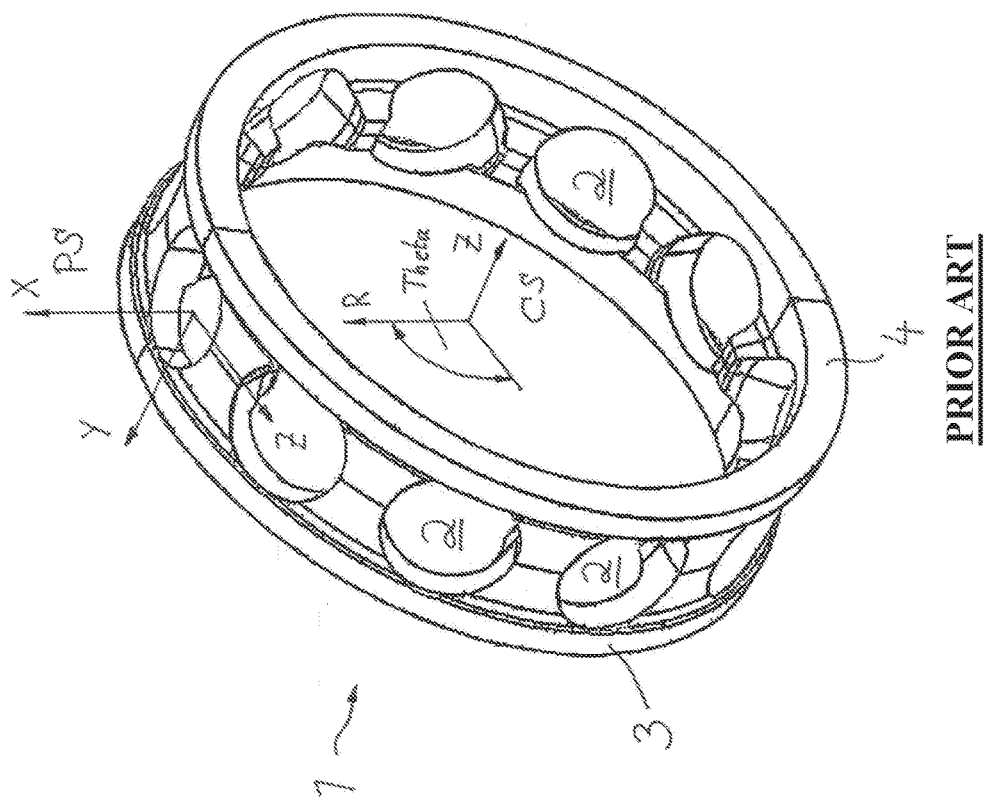
FIG. 1 shows a perspective view of a common cage of a roller bearing, wherein the used coordinate systems CS (cage system) and PS (pocket system) are depicted.

In FIG. 1 a cage 1 according to the state of the art is shown with a basis geometry which is hollow-cylindrical. The cage 1 has a plurality of pockets 2 for receiving rolling elements; the pockets 2 form surfaces for contacting the rolling element (which are not depicted). The cage 1 is thus composed of multiple pockets, each pocket providing the space for a rolling element.

In FIG. 1 the coordinate systems are depicted which are used for the further explanation of the design of the cage according to the invention. For the definition, two coordinate systems are used.

A global cylindrical coordinate system CS (cage system) is defined with the radial direction R being normal to the outer ring outer surface of the bearing and the axial direction z being the middle axis of the bore of the bearing.

A Cartesian coordinate system PS (pocket system) is placed at the center of the rolling element, with the x direction pointing in insertion direction of the rolling element, normal to the outer ring outer surface, the y direction pointing in axial direction of the bearing and the z direction pointing in the main direction of motion of the rolling element.

Figure 2:
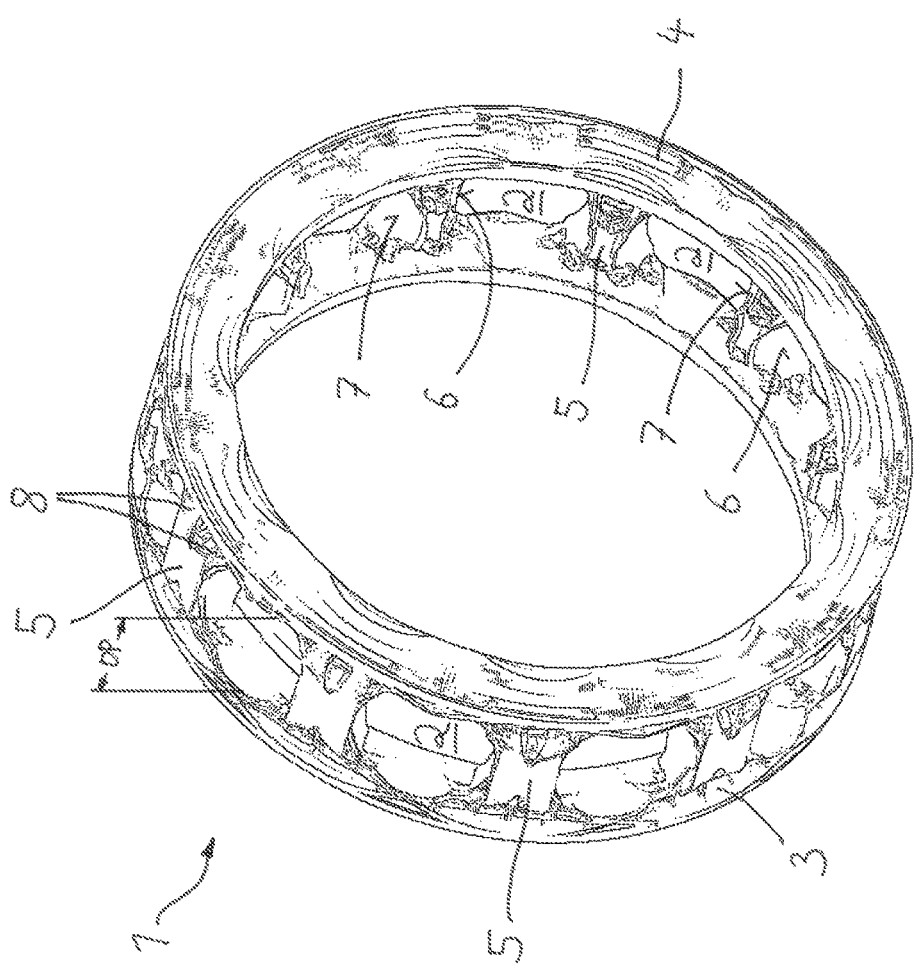
FIG. 2 shows a perspective view of a cage according to the invention.
Figure 7:
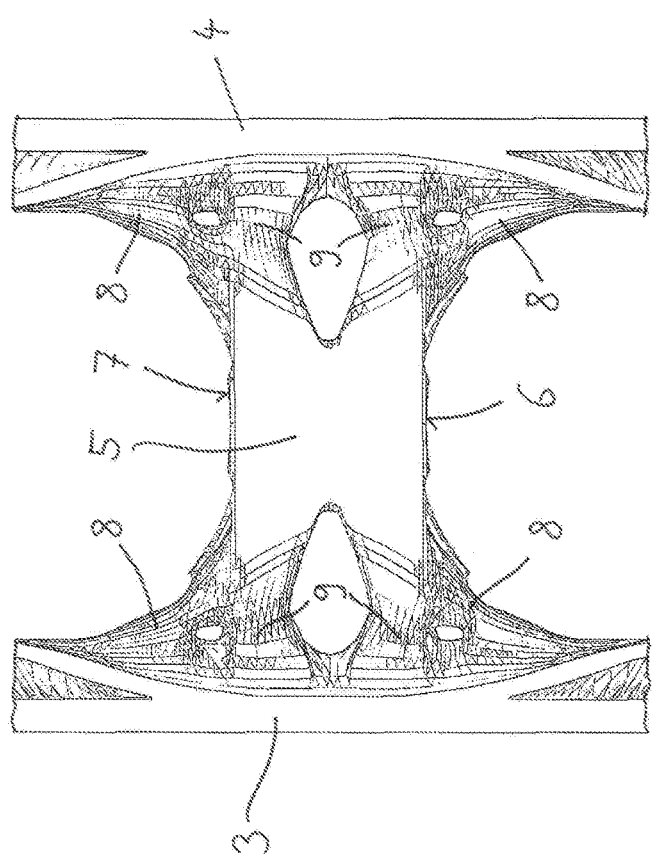
FIG. 7 shows the view in radial direction R onto a part of the cage and onto a pocket element between two side rings.
Figure 8:
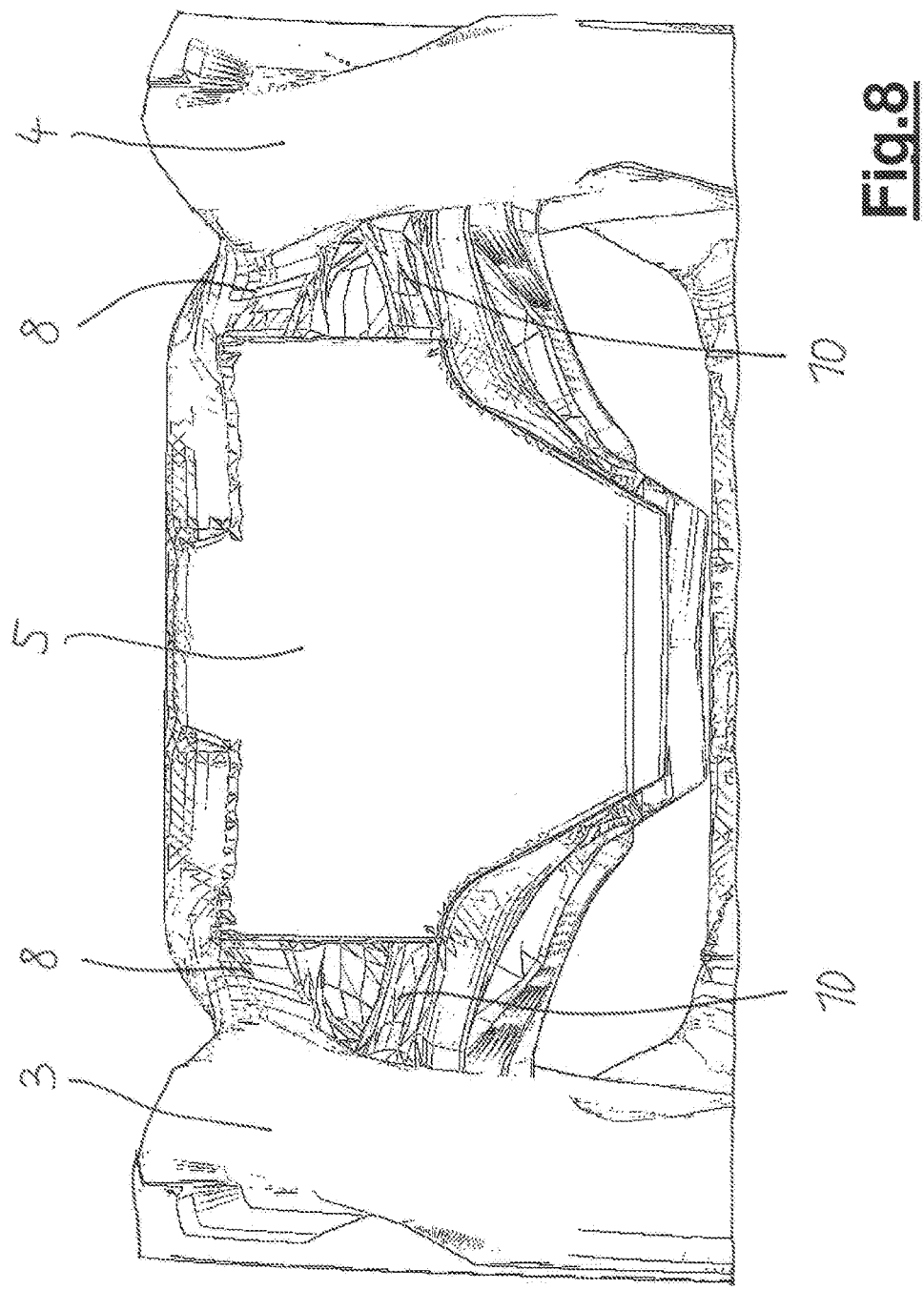
FIG. 8 shows the view in direction z of the PS onto a pocket element between two side rings.

Using these definitions, a lightweight cage as shown in FIG. 2 can be realized in the following way:

The cage 1 consist generally of two side rings 3 and 4 (being backbones of the cage) and a plurality of pocket elements 5, which are parts which are connected to the side rings 3, 4 by beams 8, 9, 10 (see specifically FIGS. 7 and 8). The pocket elements 5 are establishing the same function like the cage bars in well-known cages.

The side rings 3, 4 have an inner diameter being the pitch diameter of the bearing and an outer diameter being the pitch diameter plus 50% of the rolling element diameter. The rings 3, 4, have a minimum thickness being the larger of about 0.25 mm and 2.5% of the rolling element diameter.

Figure 5:
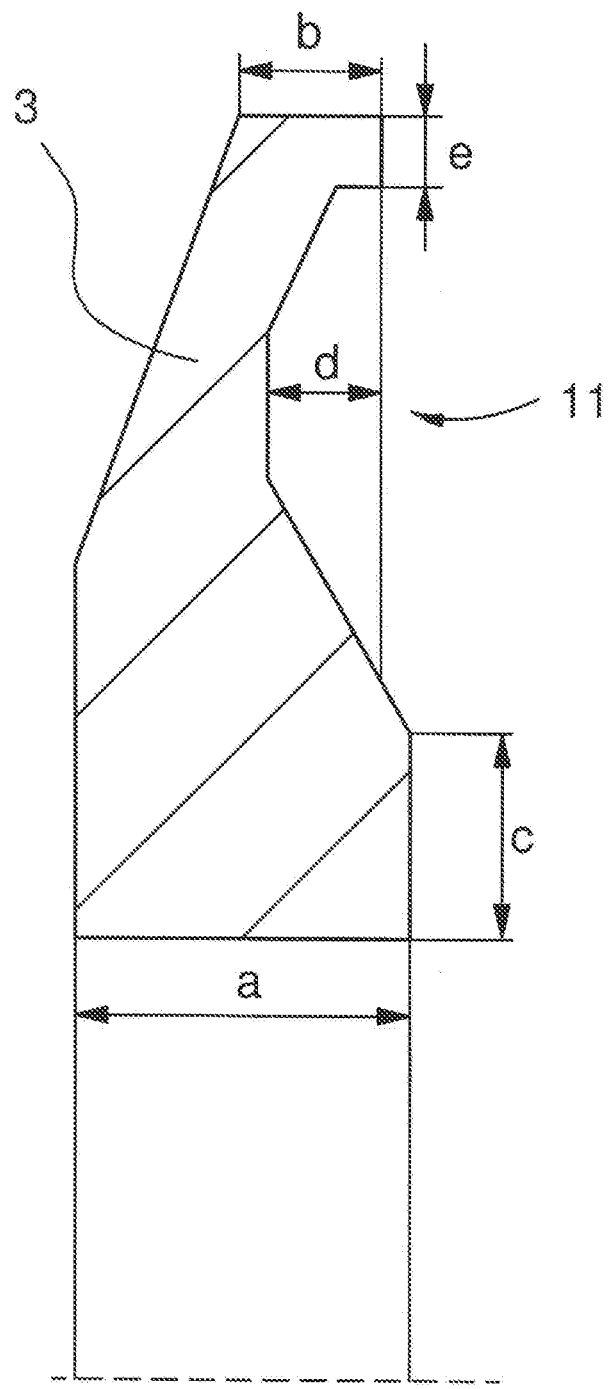
FIG. 5 shows the section through a part of a side ring, seen in an x-y-plane of the PS.

The radial section in the x-y-plane of PS of the side ring 3, 4 is shown in FIG. 5. Here, a cross sectional view of a side ring is shown. Some preferred geometry data are shown in this figure: e is the maximum of 0.25 mm and 0.05% of the rolling element diameter. b=2 e, d=1.5 e, a=4 e, c=4 e. Thus, a concave section 11 is formed which is arranged at a face side of the side ring 3.

In FIG. 2 also OP is shown which is the opening at the radial outer side of the cage 1 for inserting the rolling elements. More specifically, the two side rings 3, 4 are placed with an axial gap of about 95% of the rolling element diameter in case of a ball bearing and the rolling element length in case of a roller bearing.

The pocket elements 5 have two face sides 6 and 7 which are designed for the contact of the rolling elements which are arranged in the pockets 2. The two surfaces in the circumferential direction of a pocket provide a conformal contact surface for the rolling element. The center of all surfaces is the rolling element center. For a ball bearing (e.g. for a Deep Groove Ball Bearing DGBB or an Angular Contact Ball Bearing ACBB) cage these surfaces are spherical, with a radius about 10% larger than half the rolling element diameter.

Figure 3:
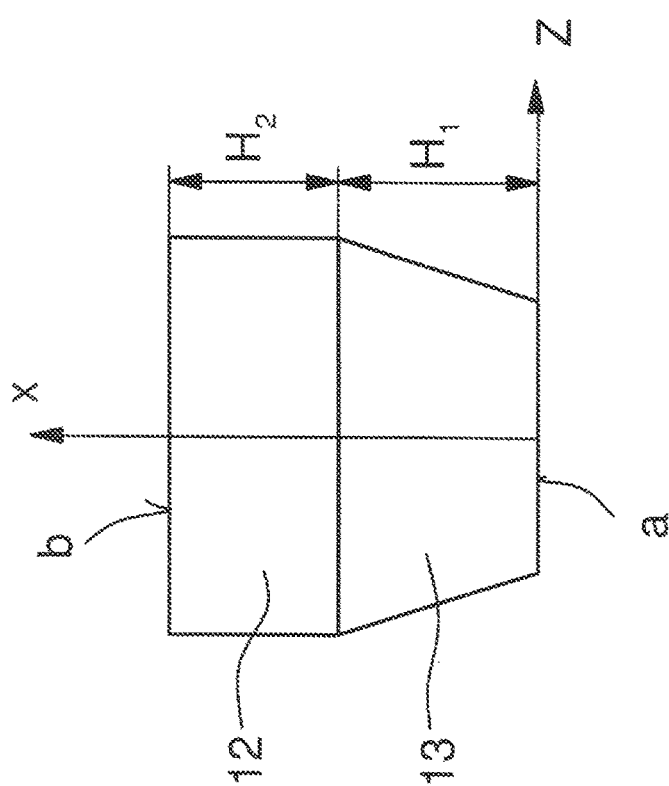
FIG. 3 shows the shape of the contact surface for a rolling element of a part of a side ring of the cage, seen in an x-z-plane of the PS.
Figure 4:
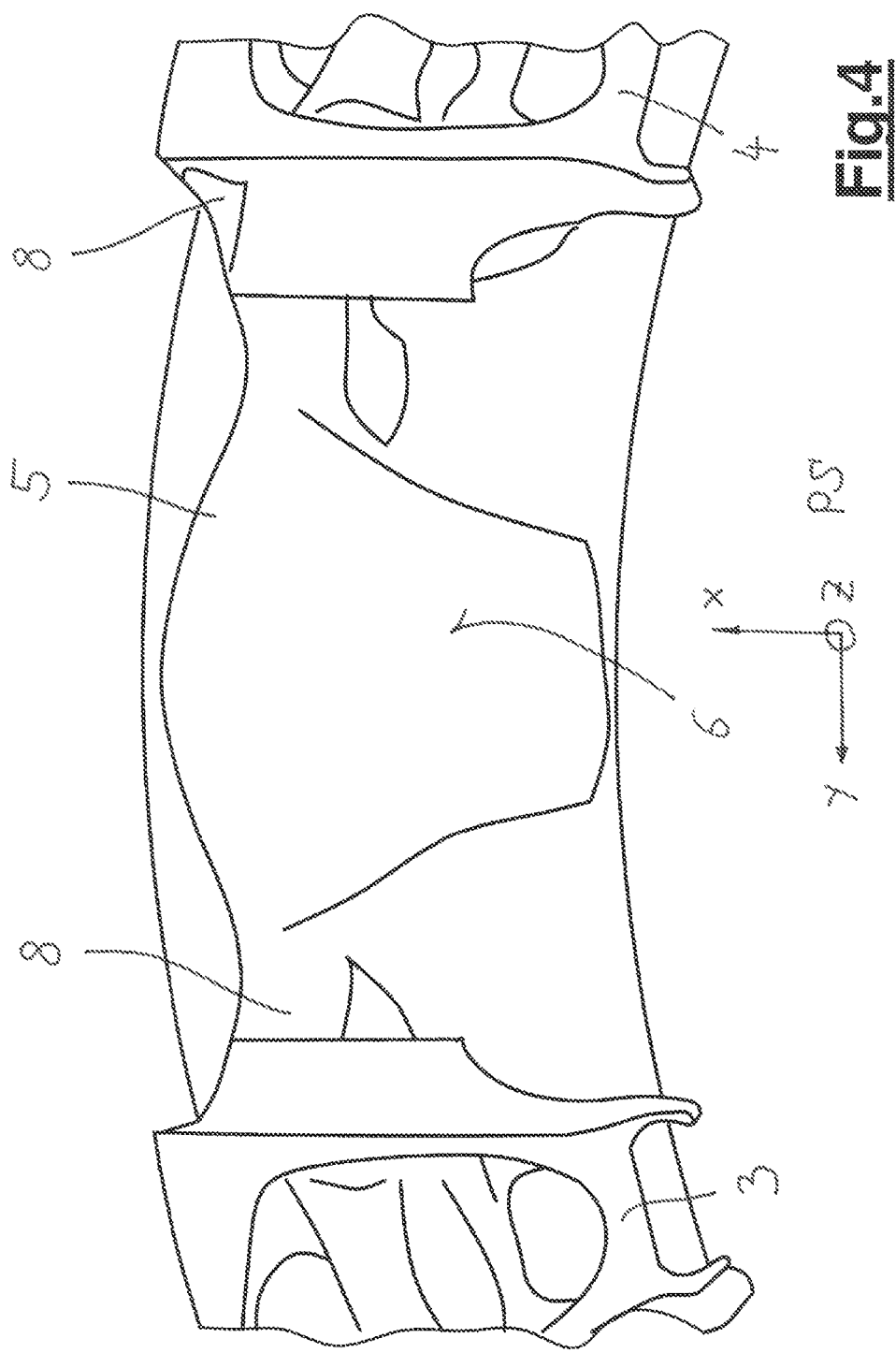
FIG. 4 shows the shape of the contact surface for a rolling element of a pocket element, seen in an x-y-plane of the PS.
Figure 6:
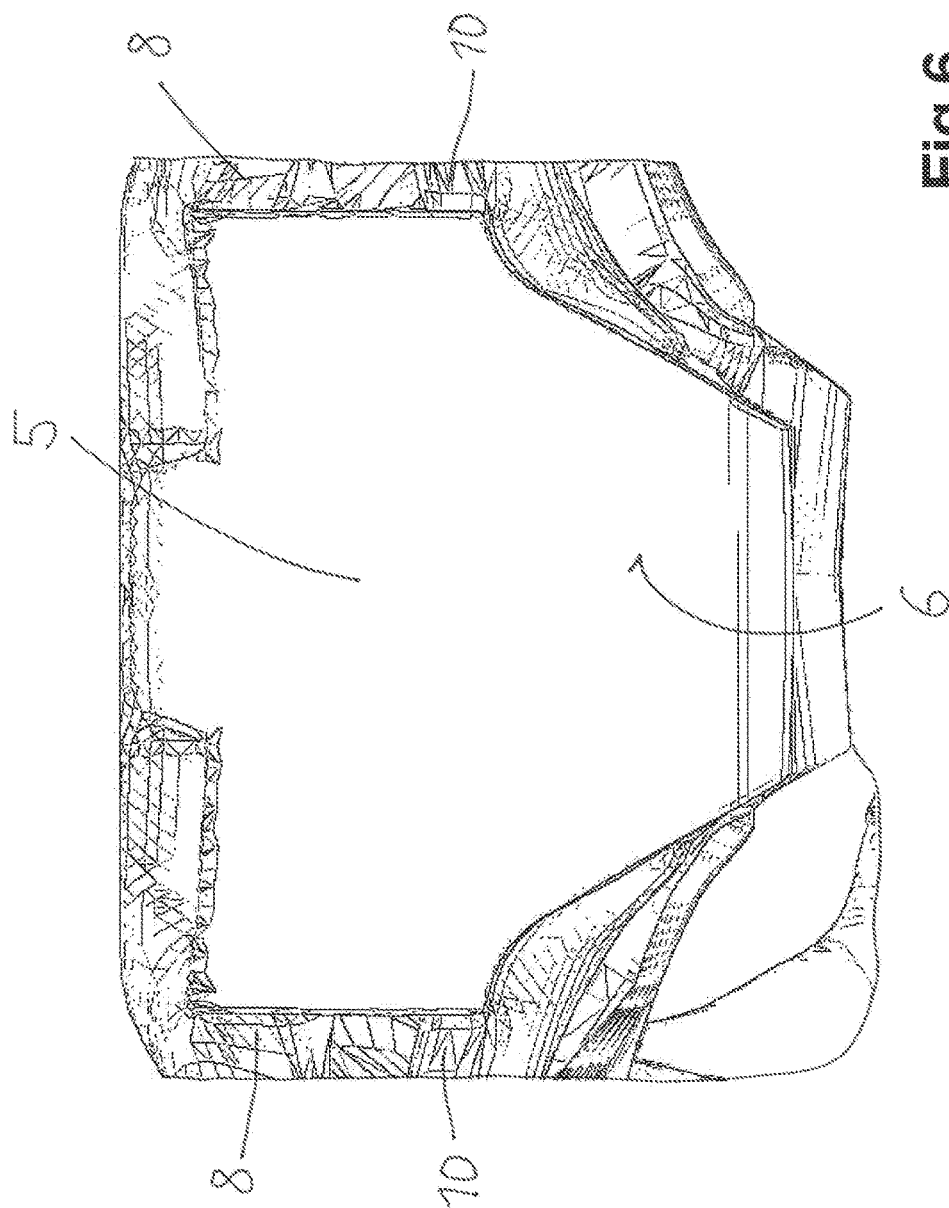
FIG. 6 shows the shape of the contact surface for a rolling element of a pocket element, seen in an x-y-plane of the PS.

When projecting the contact surface of the pocket element 5 on the x-z-plane of the PS (see the depiction in FIG. 3 and in FIG. 6) the surface has the shape of a trapezoid 13 merged with a rectangle 12 and is located in the two quadrants with positive x-values of the coordinate system. The shorter side a (see FIG. 3) of the trapezoid is closer to the z axis of the coordinate system than the longer side. The width of the shorter side is about 25% of the rolling element diameter. The width of the longer side b (see FIG. 3) is about 75% of the rolling element diameter. The height H1, H2 (see FIG. 3) is about 12.5% of the rolling element diameter.

The thickness of the pocket surface is the maximum of 0.25 mm and 2.5% of the rolling element diameter.

The two surfaces in the axial direction of a pocket provide a conformal contact surface to guide the rolling element axially. For a ball bearing, the surface is a spherical indentation of the side ring (backbone) surface with a radius of about 10% more than the radius of the rolling element.

As can be seen in FIG. 7, the central radial contact surface is placed between the tangential contact surface. It has an X-shape due to its attachment to the radial extremities of the adjacent tangential rolling element contact surface and the reduction of the axial width in towards its center. The axial width in the center is about 50% to 75% of the axial width at the attachment locations to the tangential rolling element contact surfaces.

The side ring (backbone) axial contact surface is on top of the side rings and ensures smooth contact with the outer ring.

An important aspect of the present invention is the fact that the pocket elements 5 are connected with the side rings 3, 4 on both sides by means of beams 8, 9 and 10.

Thus, each tangential ball contact surface (i.e. the pocket element 5) is connected to both side rings 3, 4 by six beams 8, 9 and 10 in the depicted embodiment. Reference is made to FIGS. 7 and 8.

Figure 9:
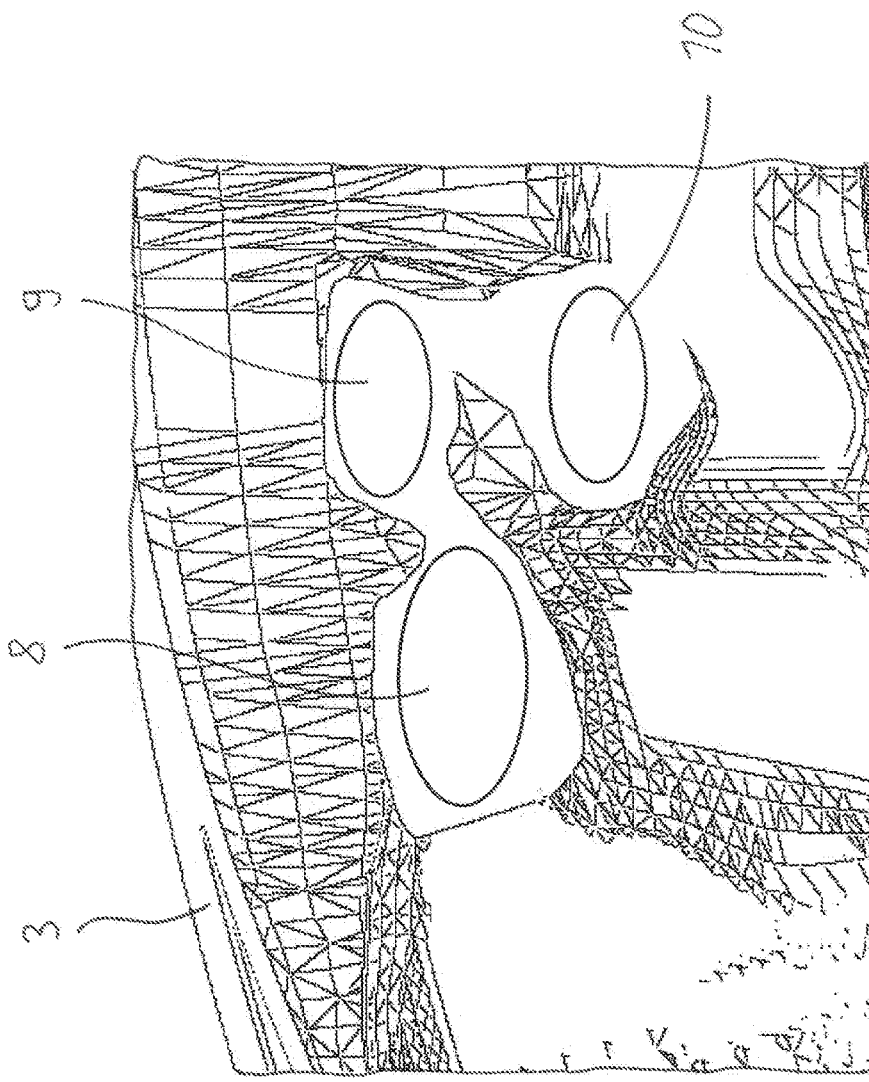
FIG. 9 shows a cross section through a part of the cage at a location about 25% from the face side of the cage, showing three beams which connect the side ring with the pocket element.

The beam 8 is defined according to FIGS. 9 and 10. The cross-section of the beam 8 is elliptical with the major axis being oriented according to the x-direction of PS and the minor axis being oriented according to the y-direction of PS, rotated by about 25 degrees around the x-axis of PS. The direction of the beam 8 is the y-direction of PS, rotated about 25 degrees around the x-axis of PS. The thickness of the beam varies.

At the thinnest position, the length of the major axis is about 15% of the rolling element diameter, the length of the minor axis is about 10% of the rolling element diameter. At the attachment points to the surfaces, these values are approximately double. The attachment point on the side ring 3, 4 is at the top of the side ring, prolonging the rolling element contact surface, i.e. about 10% of the rolling element diameter in y-direction of PS. The attachment point at the rolling element contact surface, i.e. at the pocket element 5, is in prolongation of this surface, i.e. at the top of the rolling element contact surface about 25% of the rolling element diameter in z-direction of PS.

The orientation of the beam 9 can be seen in FIG. 9. The cross-section of the beam is elliptical and, when projected on the x-y-plane of PS with the major axis being oriented in y-direction of PS and a length of about 15% of the rolling element diameter, the minor axis being oriented in x-direction of PS and a length of about 10% of the rolling element diameter, both measured in the middle of the beam. At the attachment points to the respective surfaces these values are approximately double.

The attachment point of beam 9 on the side ring 3, 4 in y-direction of PS is located about half the rolling element diameter away from the center of the rolling element, at the location of the contact point between the tangential surface and the rolling element. In x-direction of PS, the attachment point is at 75% of the radius of the rolling element. The attachment point to the pocket surface and the central radial contact surface is at the middle between the largest and the smallest axial width of this surface. The beam is oriented in z-direction of PS, rotated about +45° around the y-direction of PS so that the beam points in direction out of the center of the cage.

The orientation of beam 10 is also depicted in FIG. 9. The cross-section of the beam 10 is elliptical and, when projected on the x-y-plane of PS with the major axis being oriented in y-direction of PS and a length of about 15% of the rolling element diameter, the minor axis being oriented in x-direction of PS and a length of about 10% of the rolling element diameter, both measured in the middle of the beam. At the attachment points to the respective surfaces these values are approximately double.

The attachment point of beam 10 on the side ring 3, 4 in y-direction of PS is located about half the rolling element diameter away from the center of the rolling element, at the location of the contact point between the tangential surface and the rolling element. In x-direction of PS, the attachment point is at 50% of the radius of the rolling element. The attachment point to the pocket surface and the central radial contact surface is at the middle between the largest and the smallest axial width of this surface. The beam 10 is oriented in z-direction of PS, rotated about −30° around the y-direction of PS so that the beam 10 points in direction of the center of the cage.

Due to their diameter and location, the beams 8, 9, 10 might intersect with each other. If this is the case, they are joined with a rounding radius of the maximum of 0.25 mm and 2.5% of the rolling element diameter.

The beams are blended into the surfaces they are attached to with a rounding radius of the maximum of 0.25 mm and 2.5% of the rolling element diameter.

REFERENCE NUMERALS

1 Cage
2 Pocket
3 Side ring
4 Side ring
5 Pocket element
6 Face side
7 Face Side
8 Beam
9 Beam
10 Beam
11 Concave section
12 Rectangular portion
13 Trapezoid portion
OP Opening

The invention claimed is:

1. A cage for a roller bearing comprising:
a base body with a plurality of pockets for receiving rolling elements, wherein the base body comprises:
two side rings arranged in a defined axial distance; and
a plurality of pocket elements located between the side rings, wherein each of the plurality of pocket element comprises:
two face sides designed for contacting a rolling element, wherein the connection between the pocket element and each of the side rings is established by at least one beam that is joined with one of the side rings and the pocket element, wherein beside the at least one beam no further connection exists between the pocket element and each of the side rings and wherein the at least one beam has a ring-shaped or elliptical cross section in a section perpendicular to the longitudinal extension of the beam; the at least one beam further comprising four or six beams arranged to establish the connection between the pocket element and each of the side rings.

2. The cage according to claim 1, wherein the at least one beam has a rounding radium at the location where it merges with the side ring and/or with the pocket element wherein the rounding radium is 0.2 mm to 0.3 mm or 2.0% to 3.0% of the diameter of the rolling element, whichever is greater.

3. The cage according to claim 1, wherein the two side rings are spaced in an axial distance in which a radial outer opening (OP) for the rolling elements is given between 92.5% and 97.5% of the diameter of the rolling elements in the case of a ball bearing and of the length of the rolling elements in the case of a rolling bearing.

4. The cage according to claim 1, wherein the side rings have a concave shape at a face side.

5. The cage according to claim 1, wherein the side sings extend radially between an inner radius which corresponds to a pitch circle of the roller bearing and an outer radius which corresponds to the pitch circle plus half of the diameter of the rolling element.

6. The cage according to claim 1, wherein the surface of the side rings which are facing the rolling elements comprise a substantially radial outer rectangular portion and an adjoining radial inner trapezoid portion seen perpendicular onto the surface.

7. The cage according to claim 1, wherein the face sides of the pocket elements have a concave surface, wherein the concave surface is spherical and has a radium which is between 105% and 115% of the diameter of the rolling elements.

8. A cage for a roller bearing comprising:
a base body with a plurality of pockets for receiving rolling elements, wherein the base body comprises:
two side rings arranged in a defined axial distance; and
a plurality of pocket elements located between the side rings, wherein each of the plurality of pocket element comprises:
two face sides designed for contacting a rolling element, wherein the connection between the pocket element and each of the side rings is established by at least one beam that is joined with one of the side rings and the pocket element, wherein beside the at least one beam no further connection exists between the pocket element and each of the side rings and wherein the at least one beam has a ring-shaped or elliptical cross section in a section perpendicular to the longitudinal extension of the beam, wherein the at least one beam has a minimum diameter which is between 10% and 20% of the diameter of the rolling element, wherein the at least one beam has an enlarged diameter at the location where it merges with the side ring and/or with the pocket element, wherein the diameter at that location is double the value of the minimum diameter.

9. The cage according to claim 8, wherein the at least one beam has a rounding radium at the location where it merges with the side ring and/or with the pocket element wherein the rounding radium is 0.2 mm to 0.3 mm or 2.0% to 3.0% of the diameter of the rolling element, whichever is greater.

10. The cage according to claim 8, wherein the two side rings are spaced in an axial distance in which a radial outer opening (OP) for the rolling elements is given between 92.5% and 97.5% of the diameter of the rolling elements in the case of a ball bearing and of the length of the rolling elements in the case of a rolling bearing.

11. The cage according to claim 8, wherein the side rings have a concave shape at a face side.

12. The cage according to claim 8, wherein the side sings extend radially between an inner radius which corresponds to a pitch circle of the roller bearing and an outer radius which corresponds to the pitch circle plus half of the diameter of the rolling element.

13. The cage according to claim 8, wherein the surface of the side rings which are facing the rolling elements comprise a substantially radial outer rectangular portion and an adjoining radial inner trapezoid portion seen perpendicular onto the surface.

14. The cage according to claim 8, wherein the face sides of the pocket elements have a concave surface, wherein the concave surface is spherical and has a radium which is between 105% and 115% of the diameter of the rolling elements.

15. A method for producing a cage of a roller bearing comprising:
providing a ring-shaped base body with a plurality of pockets for receiving rolling elements, wherein the base body is formed by two side rings arranged in a defined axial distance and by a plurality of pocket elements located between the side rings, wherein each pocket element has two face sides designed for contacting a rolling element, wherein the connection between the pocket element and each of the side rings is established by at least one beam that is joined with one of the side rings and the pocket element, wherein beside the at least one beam no further connection exists between the pocket element and each of the side rings, wherein the at least one beam has a ring-shaped or elliptical cross section in a section perpendicular to the longitudinal extension of the beam, and
producing the cage by means of an additive manufacturing process, and wherein a plastic material is used for the production of the cage.

16. The method according to claim 15, the production of the cage is carried out by means of a 3-D printing process.

17. The method according to claim 15, the production of the cage is carried out by means of a stereo-lithographic process.

* * * * *